(12) United States Patent
Grauer et al.

(10) Patent No.: US 10,564,267 B2
(45) Date of Patent: Feb. 18, 2020

(54) HIGH DYNAMIC RANGE IMAGING OF ENVIRONMENT WITH A HIGH INTENSITY REFLECTING/TRANSMITTING SOURCE

(71) Applicant: Brightway Vision Ltd., Haifa (IL)

(72) Inventors: Yoav Grauer, Haifa (IL); Ofer David, Haifa (IL); Eyal Levi, Haifa (IL); Ezri Sonn, Haifa (IL); Haim Garten, Haifa (IL)

(73) Assignee: Brightway Vision Ltd. (IL)

( * ) Notice: Subject to any disclaimer, the term of this patent is extended or adjusted under 35 U.S.C. 154(b) by 105 days.

(21) Appl. No.: 15/514,910

(22) PCT Filed: Oct. 15, 2015

(86) PCT No.: PCT/IL2015/051028
§ 371 (c)(1),
(2) Date: Mar. 28, 2017

(87) PCT Pub. No.: WO2016/067280
PCT Pub. Date: May 6, 2016

(65) Prior Publication Data
US 2017/0234976 A1 Aug. 17, 2017

Related U.S. Application Data

(60) Provisional application No. 62/195,317, filed on Jul. 22, 2015.

(30) Foreign Application Priority Data

Oct. 27, 2014 (IL) .......................................... 235359

(51) Int. Cl.
*G01S 7/00* (2006.01)
*G01S 7/486* (2020.01)
(Continued)

(52) U.S. Cl.
CPC .............. *G01S 7/4868* (2013.01); *B60Q 1/14* (2013.01); *G01S 7/483* (2013.01); *G01S 7/4863* (2013.01);
(Continued)

(58) Field of Classification Search
CPC .................................. B60Q 1/14; H04N 3/14
See application file for complete search history.

(56) References Cited

U.S. PATENT DOCUMENTS 4,485,405 A 11/1984 Bailey
5,231,401 A * 7/1993 Kaman ................... G01S 17/89
250/332

(Continued)

FOREIGN PATENT DOCUMENTS

WO 2004106112 A1 12/2004
WO 2013157001 A1 10/2013

OTHER PUBLICATIONS

Search Report and Written Opinion for PCT/IL2015/051028, dated May 6, 2016, 9 pages.

*Primary Examiner* — Hovhannes Baghdasaryan
(74) *Attorney, Agent, or Firm* — Luedeka Neely Group, P.C.

(57) ABSTRACT

Active-gated imaging system and method for imaging environment with at least one high-intensity source. A light source emits light pulses toward the environment, and an image sensor with a pixelated sensor array receives reflected pulses from a selected depth of field and generates a main image. The image sensor exposure mechanism includes a pixelated transfer gate synchronized with the emitted pulses. An image processor identifies oversaturated image portions of the main image resulting from a respective high-intensity source, and interprets the oversaturated image portions using supplementary image information acquired by image sensor. The supplementary information may be obtained from: a (Continued)

low-illumination secondary image having substantially fewer gating cycles than the main image; by accumulating reflected pulses from the high-intensity source after the reflected pulses undergo internal reflections between optical elements of the camera; or a low-illumination secondary image acquired by residual photon accumulation during a non-exposure state of image sensor.

15 Claims, 6 Drawing Sheets

(51) Int. Cl.
*G01S 17/10* (2020.01)
*G01S 17/89* (2020.01)
*G01S 17/93* (2020.01)
*G01S 7/4863* (2020.01)
*G01S 7/483* (2006.01)
*B60Q 1/14* (2006.01)
*G01S 17/02* (2020.01)

(52) U.S. Cl.
CPC ............ *G01S 17/107* (2013.01); *G01S 17/89* (2013.01); *G01S 17/936* (2013.01); *G01S 17/023* (2013.01)

(56) References Cited

U.S. PATENT DOCUMENTS

| 5,576,827 | A | * | 11/1996 | Strickland | G01N 15/0211 356/336 |
| 7,733,464 | B2 | | 6/2010 | David et al. | |
| 2002/0030837 | A1 | * | 3/2002 | Hokoi | H04N 1/401 358/1.9 |
| 2006/0012697 | A1 | * | 1/2006 | Boemler | H04N 5/335 348/296 |
| 2007/0276198 | A1 | * | 11/2007 | Eli | A61B 1/04 600/300 |
| 2014/0043483 | A1 | | 2/2014 | Schuder et al. | |
| 2015/0076355 | A1 | * | 3/2015 | Grauer | H04N 5/353 250/349 |

\* cited by examiner

(ORIGINAL MAIN IMAGE WITH OVERSATURATED IMAGE PORTIONS):

FIG. 5A (SUPPLEMENTARY IMAGE WITH SECONDARY IMAGE DATA FROM RESIDUAL PHOTO ACCUMULATION):

HIGH DYNAMIC RANGE IMAGING OF ENVIRONMENT WITH A HIGH INTENSITY REFLECTING/TRANSMITTING SOURCE

CROSS-REFERENCE TO RELATED APPLICATIONS

This application is a National Phase application filed under 35 U.S.C. § 371 of PCT International Application No. PCT/IL2015/051028 with an International Filing Date of Oct. 15, 2015, which claims priority to Israel Patent Application No. 235359, filed on Oct. 27, 2014, and U.S. Provisional Patent Application No. 62/195,317, filed on Jul. 22, 2015, the entire contents of which are incorporated herein by reference.

FIELD OF THE INVENTION

The present invention relates to imaging systems in general, and to active-gated imaging systems for vehicles in particular.

BACKGROUND OF THE INVENTION

Night vision imaging systems produce visible images of an environment having minimal ambient light, which would otherwise not be visible to the human eye. Such systems are used by military and law enforcement units, as well as various civilian applications. One such application is for improving the visibility of a vehicle driver during night, rain, fog, or other poor visibility driving conditions. The generated image of the area surrounding the vehicle may be processed to provide various driver assistance and safety features, such as: forward collision warning (FCW), lane departure warning (LDW), traffic sign recognition (TSR), and the detection of pedestrians, obstacles, oncoming vehicles, or other entities along the driving route. The image may also be displayed to the driver, for example projected on a head-up display (HUD) on the vehicle windshield. A vehicle night vision system may also be used to enable autonomous driving at low light levels or poor visibility conditions.

An illumination-based imaging system may operate using "active imaging" or "passive imaging". An active imaging system involves actively illuminating the environment and accumulating reflections of the illumination light, whereas a passive imaging system merely collects existing ambient light or emitted/reflected radiation. For example, a passive imaging system may utilize a thermal or infrared camera, which senses differences in infrared radiation emitted by objects in the surrounding area and generates an "emission-based image" according to the sensed radiation differences. An active illumination imaging system requires a light source to illuminate the environment, and an imaging sensor to accumulate the reflected light, producing a "reflection-based image". Active imaging allows for a visible image to be generated even when there is little or no ambient light present in the environment. The light source, which may be, for example, an LED, a filtered light bulb, or a laser, may transmit the light in the form of continuous wave (CW) or in a series of pulses. The image sensor may be semiconductor based, such as charge-coupled devices (CCD), or active-pixel sensors (APS) produced using the complementary metal-oxide-semiconductor (CMOS) or the N-type metal-oxide-semiconductor (NMOS) processes.

The technique of synchronizing the illumination pulses with the camera activation in active imaging systems in order to image a particular depth of field, also known as "gated imaging", is known in the art. This technique is disclosed, for example, in U.S. Pat. No. 7,379,164 to Inbar et al., entitled "Laser gated camera imaging system and method"; in U.S. Pat. No. 7,733,464 to David et al., entitled "Vehicle mounted night vision imaging system and method"; in U.S. Pat. No. 8,194,126 to David et al., entitled "Gated imaging"; in PCT Patent Application Publication No. WO2013/157001 to Grauer et al., entitled "Multiple gated pixel per readout"; and in PCT Patent Application Publication No. WO2013/179280 to Grauer et al., entitled "Gated imaging using an adaptive depth of field". After the illumination pulse is transmitted, the camera remains in an off state (i.e., does not accumulate any reflected photons), while the pulse reaches the target area and light is reflected back toward the camera. When the reflected light is due to arrive at the camera, the camera is activated to open (i.e., accumulates reflected photons). After the pulse is received, the camera is turned back off, while awaiting the transmission and reflection of the subsequent illumination pulse. The camera remains off for the duration of time required for the pulse to travel toward the target area and be reflected back, and is subsequently activated only for the duration required to receive the reflected light from the desired depth of field. In this manner, the camera receives only reflections from the desired range, and avoids reflections from other objects, such as particles in the atmosphere which may cause backscattering and reduce the contrast of the target area in the generated image. Gated imaging may also be employed to diminish the potential for oversaturation and blooming effects in the sensor, by collecting fewer pulses from shorter distances, thereby lowering the overall exposure level of the camera to near-field scenery and avoiding high-intensity reflections from very close objects. Similarly, the light intensity or the shape of the illumination pulse may be controlled as a function of the distance to the target object, ensuring that the intensity of the received reflected pulse is at a level that would not lead to overexposure of the image sensor.

During the period when a camera sensor is not exposed (i.e., while the light pulse may still be propagating through the atmosphere), the sensor ideally will not accumulate any photons. But in practice, a certain level of residual light may still enter the image sensor or be accumulated by the image sensor (i.e., signal charge can be stored in the memory node without being contaminated by parasitic light). This phenomenon of "leakage photons" is especially problematic in CMOS sensors, where it is difficult to mask the memory node (MN) and floating diffusion in the pixel level sensor (typical masking approaches include: micro-lens focusing light away from the MN, metal layers above the MN, potential attracting the photoelectrons to the photodiode, and potential barriers around the MN).

The presence of highly-reflective sources (e.g., retroreflective signs) and/or highly-transmitting sources (e.g., illuminating objects, such as sunlight or vehicle high beams) in the environment, can adversely affect the performance of both gated and non-gated illumination-based imaging systems. Due to the excessive intensity of the reflections from such high reflecting/transmitting sources, the resultant image may include portions with extremely high brightness (i.e., appearing overexposed or "washed-out"), rendering the respective features unclear and indecipherable. The excessive reflections received by the image sensor may also result in a phenomenon known as "blooming", in which a bright halo appears surrounding the high-reflective object in the reflection-based image, so that other objects in the immediate vicinity are also obstructed from view. As a result of these saturation and blooming effects, it may be difficult to ascertain with a high degree of confidence the presence of relevant high-reflective/high-transmitting objects in the environment, and to accurately identify whether they pose a potential hazard. For example, the detection of an oncoming vehicle may be delayed or precluded due to saturated image portions resulting from the vehicle headlights. The increased time and processing required to accurately determine potential hazards in the vehicle environment also necessitates a longer decision making period, which may increase the likelihood of a traffic accident. Furthermore, the saturated and bloomed image regions on a displayed image may distract the vehicle driver, and prevent or delay the driver from noticing other important features in the image.

The pixel integration/readout scheme of an imaging sensor may be linear or logarithmic. Many CCD and CMOS sensors operate using a linear response, which may result in a higher signal-to-noise ratio (SNR) but are only capable of imaging a limited dynamic range (e.g., under 3 orders of magnitude). In contrast, scenes with a wide dynamic range (e.g. over 4 orders of magnitude) may be imaged using logarithmic pixels that compress the dynamic range of the input signal using a sub-threshold operational region of the transistor. The same image sensor may also be configured to operate in either a linear or a logarithmic operational mode, as disclosed for example in: Tu, N. et al, "CMOS Active Pixel Image Sensor with Combined Linear and Logarithmic Mode Operation", IEEE Canada conference on Electrical and Computer Engineering 1998, vol. 2, pp 754-757, 19.

Accordingly, one approach for overcoming the image saturation and blooming from high-reflective/high-transmitting objects involves using high dynamic range (HDR) sensors (such as with logarithmic pixel integration). For example, U.S. Pat. No. 7,221,866 to Clemens, entitled "Methods for creating spherical imagery", describes a method for obtaining high dynamic range (HDR) spherical images without requiring special purpose cameras having linear optical sensors, such as using a standard single reflect (SLR) camera with a fisheye lens. The camera is positioned to obtain a first set of images at different exposures with the camera facing up, and positioned to obtain a second set of images at different exposures with the camera facing down. The first set of images is combined with the second set of images to produce an HDR spherical image.

PCT Patent Application Publication No. WO2013/048994 to Kussel, entitled "Vehicle camera image quality improvement in poor visibility conditions by contrast amplification", describes a vision system for a vehicle. The vision system includes an imaging sensor that captures image data and an image processor that is operable to process successive frames of captured image data. The image processor increases the contrast of the captured images to enhance discrimination of objects in the field of view of the imaging sensor in response to a determination of a low visibility driving condition.

US Patent Application No. 2008/0024608 to Hahn et al., entitled "Method and device for visualizing the surroundings of a vehicle by fusing an infrared image and a visual image", describes a method for visualizing surroundings of a vehicle. A visual image and an infrared image are fused into a target image, which can be represented in an image display unit, in order to simplify the allocation of the infrared radiation-emitting objects in the recorded environment.

US Patent Application No. 2013/0083195 to Remillard et al., entitled "Polarization-based anti-blinding night vision system, vehicle comprising same, and method therefore", discloses an active night vision system of a vehicle and a method for limiting the potential for blinding of night vision cameras of oncoming vehicles. In particular, the method is directed to precluding the night vision camera of a first vehicle from being blinded by an NIR light source of a night vision system of a second vehicle, even when camera is a rolling shutter type. The system includes a night vision illuminator, an imaging apparatus, and a first light conditioning structure. The night vision illuminator illuminates a space with NIR light linearly polarized in a direction parallel with a first polarization axis (e.g., horizontal polarization). The imaging apparatus creates an electrical representation of an image defined by received NIR light. A FOV of the imaging apparatus includes at least a portion of the space illuminated by the illuminator. The first light conditioning structure linearly polarizes the NIR light received by the imaging apparatus, in a direction that is non-parallel to the first polarization axis (e.g., vertical polarization).

SUMMARY OF THE INVENTION

In accordance with one aspect of the present invention, there is thus provided an active-gated imaging system for imaging an environment with the presence of at least one high-intensity source. The imaging system includes a light source, a gated camera with an imaging sensor, a controller, and an image processor. The light source is configured to emit light pulses toward the environment. The image sensor includes a pixelated sensor array configured for digital image acquisition. The image sensor is configured to receive reflected pulses from a selected depth of field (DOF) in the environment and to generate a main image, where the exposure mechanism of the image sensor includes a pixelated transfer gate synchronized with the emitted pulses. The image sensor further includes an adaptively controllable anti-blooming mechanism configured to direct excess saturation from a respective pixel of the sensor array to neighboring pixels. The controller is configured to control the operation of the light source and the image sensor. The image processor is configured to identify at least one oversaturated image portion of the main image resulting from a respective high-intensity source, and to interpret the oversaturated image portion using supplementary image information acquired by the image sensor. The image processor may be further configured to generate a merged image by combining the main image with the supplementary image information. The supplementary image information may be obtained from at least one low-illumination secondary image of the DOF acquired by the image sensor, where the number of gating cycles of the secondary image is substantially less than the number of gating cycles of the main image. The supplementary image information may be obtained from the main image by accumulating reflected pulses from the high-intensity source after the reflected pulses undergo internal reflection between optical elements of the camera. The supplementary image information may be obtained from at least one low-illumination secondary image frame of the DOF acquired by the image sensor, by residual photon accumulation when the image sensor is in a non-exposure state. The imaging system may further include a display, configured to display the main image, the supplementary image information, and/or the merged image. The controller may adaptively control at least one gating parameter of the light source or the camera, in accordance with the supplementary image information. The controller may minimize the frame duration of at least one image frame, to reduce ambient light accumulation in the image frame. The processor may provide an indication of at least one object of interest in the environment. The image sensor may include an addressable switching mechanism, configured to selectively adjust the intensity level of at least one selected pixel by controlling the number of exposures of the selected pixel, to minimize intense reflections from high-intensity sources incident on the selected pixel. The imaging system may be mounted on a vehicle.

In accordance with another aspect of the present invention, there is thus provided a method for active-gated imaging of an environment with the presence of at least one high-intensity source. The method includes the procedures of: emitting light pulses toward the environment, using a light source; and receiving reflected pulses from a selected DOF in the environment to generate a main image, using a gated camera that includes an image sensor with a pixelated sensor array configured for digital image acquisition, where the exposure mechanism of the image sensor includes a pixilated transfer gate synchronized with the emitted pulses. The method further includes the procedure of directing excess saturation from a respective pixel of the sensor array to neighboring pixels, with an adaptively controllable anti-blooming mechanism of the image sensor. The method further includes the procedures of: identifying at least one oversaturated image portion of the main image resulting from a respective high-intensity source; and interpreting the oversaturated image portion using supplementary image information acquired by the image sensor. The method may further include the procedure of generating a merged image by combining the main image with the supplementary image information. The supplementary image information may be obtained from at least one low-illumination secondary image of the DOF acquired by the image sensor, where the number of gating cycles of the secondary image is substantially less than the number of gating cycles of the main image. The supplementary image information may be obtained from low-illumination image content in the main image, by accumulating reflected pulses from the high-intensity source after the reflected pulses undergo internal reflection between optical elements of the camera. The supplementary image information may be obtained from at least one low-illumination secondary image frame of the DOF acquired by the image sensor, by residual photon accumulation when the image sensor is in a non-exposure state. The method may further include the procedure of displaying the main image, the supplementary image information, and/or the merged image. The method may further include the procedure of adaptively controlling at least one gating parameter of the light source or the camera, in accordance with the supplementary image information. Controlling a gating parameter may include minimizing the frame duration of at least one image frame, to reduce ambient light accumulation in the image frame. The method may further include the procedure of providing an indication of at least one object of interest in the environment.

BRIEF DESCRIPTION OF THE DRAWINGS

The present invention will be understood and appreciated more fully from the following detailed description taken in conjunction with the drawings in which.

DETAILED DESCRIPTION OF THE EMBODIMENTS

The present invention overcomes the disadvantages of the prior art by providing an active-gated imaging system and method for imaging of an environment with the presence of at least one high-intensity source, to produce a high dynamic range (HDR) image, even when using a linear (non-logarithmic) imaging sensor. The term "high-intensity source", as used herein, refers to any object or entity that reflects and/or emits a substantially high level of radiant intensity, such that the reflections received therefrom by an (active or passive) imaging system would result in an unclear or incomprehensible image portion (e.g., due to undesirable electro-optical phenomena, such as saturation or blooming effects). For example, a high-intensity source may be a "highly-reflective source", such as a retro-reflector (e.g., a retro-reflective traffic sign or a retroreflective sheet on a vehicle rear bumper), and/or may be a "highly-transmitting source", such as: sunlight, vehicle high beams, or a light source of another active imaging system (e.g., on an oncoming vehicle). Alternatively, a high-intensity source may be considered an object or entity from which the received reflection signal exceeds the dynamic range of the image sensor pixels, resulting in pixel saturation and perhaps also photon overflow into neighboring pixels. For example, a retro-reflective source may reflect light at least two orders of magnitude greater than would a diffusive source located at the same distance.

Figure 1:
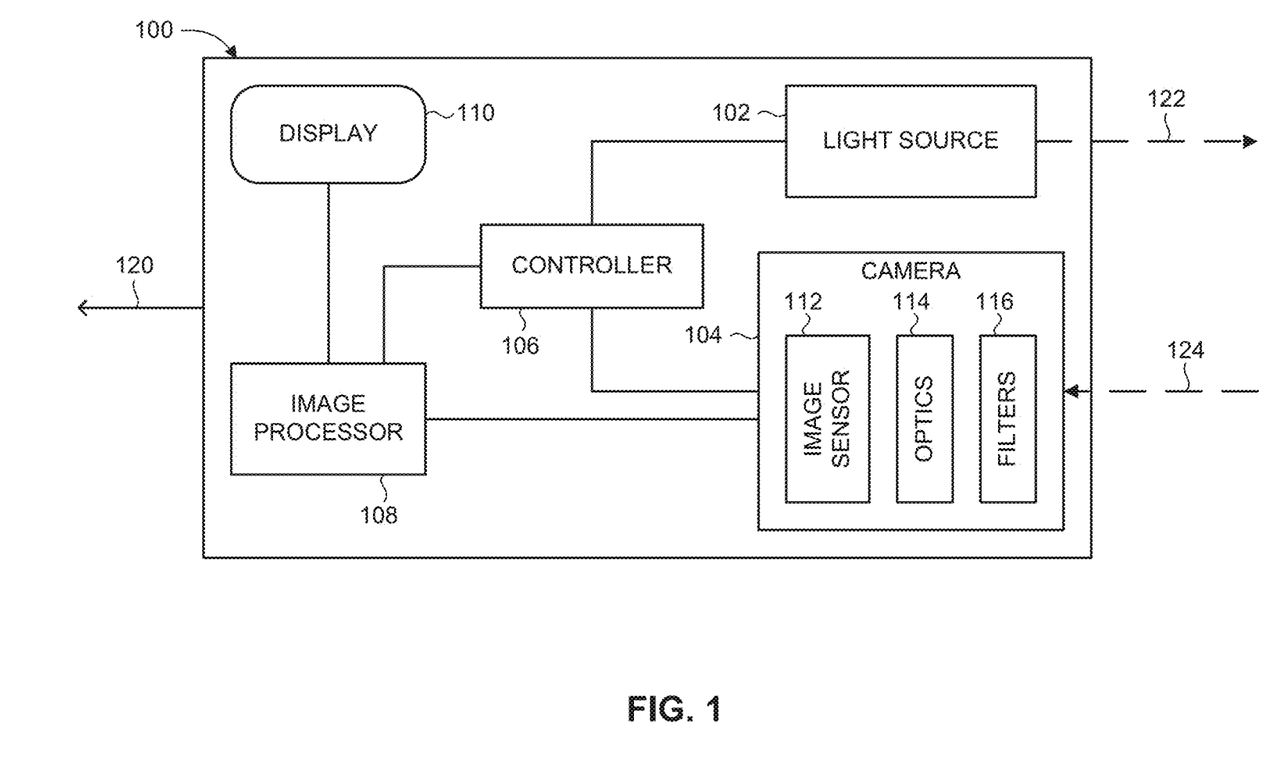
FIG. 1 is a schematic illustration of an active-gated imaging system for imaging an environment with the presence of at least one high-intensity source, constructed and operative in accordance with an embodiment of the present invention.

Reference is now made to FIG. 1, which is a schematic illustration of an active-gated imaging system, generally referenced 100, for imaging an environment with the presence of at least one high-intensity source, constructed and operative in accordance with an embodiment of the present invention. Imaging system 100 includes at least one light source 102, at least one camera 104, a controller 106, an image processor 108, and a display 110. Controller 106 is coupled with light source 102, with camera 104, and with image processor 108. Image processor 108 is further coupled with display 110.

Imaging system 100 may operate using active imaging, in which an image of the scene is generated from accumulated light reflections (by image sensor 112) after the transmission of light (by light source 102) to illuminate the scene. Imaging system 100 is configured with a gated imaging capability, such that the activation of camera 104 is synchronized with the illumination pulses 122 in order to image a particular depth of field (DOF). For example, camera 104 is activated to accumulate photons when the reflected pulses 124 from a specific distance are due to arrive at camera 104, and is deactivated (prevented from accumulated photons) during other time periods. Imaging system 100 may also operate in a non-gated imaging mode. According to some embodiments of the present invention, imaging system 100 may operate using passive imaging, i.e., without actively illuminating the scene by light source 102, such that image sensor 112 receives emitted or reflection radiation with only the existing ambient light.

Light source 102 emits a series of light pulses, such as light pulse 122, toward an area or environment to be imaged by system 100. Light source 102 may alternatively emit continuous wave (CW) radiation. The emitted light may be any suitable wavelength, such as in the near infrared (NIR) or short wave infrared (SWIR) spectral ranges. Light source 102 may be embodied by a laser diode, such as an edge-emitting semiconductor laser or a vertical-cavity surface-emitting laser (VCSEL), or by a non-laser light source, such as a light emitting-diode (LED) or a gas discharge lamp. The particular characteristics of the emitted light may be selected in accordance with the imaged area and the environmental conditions. For example, the pulse width, the intensity (peak power), the polarization and/or the shape of the illumination pulse 122 may be controlled as a function of the distance to an object to be imaged (i.e., the desired DOF).

Camera 104 receives reflected light, such as reflected light pulse 124, reflected from objects illuminated by emitted light pulses 122. Camera 104 includes at least one image sensor 112 that accumulates the reflected light pulses 124 and generates a digital image of the scene. Image sensor 112 may be, for example, a CCD sensor or a CMOS sensor, such as an active pixel sensor (APS) array. Image sensor 112 may also be a hybrid sensor (e.g., an indium gallium arsenide (InGaAs) based photodetector or a mercury cadmium telluride (MCT) based photodetector), with or without gain. Camera 104 may also include an image intensifier coupled with the sensor array 112. The exposure mechanism of image sensor 112 involves a pixelated transfer gate that transfers charge from a photodiode to a floating diffusion node for each individual pixel in the sensor array (where each pixel may be associated with more than one transfer gate element and more than one floating diffusion node element). Image sensor 112 operates in a substantially similar spectral range as light source 102 (e.g., in the NIR, and/or SWIR spectrum). Image sensor 112 is operative to acquire at least one image frame, such as a sequence of consecutive image frames representing a video image, which may be converted into an electronic signal for subsequent processing and/or transmission. The image generated by image sensor 112 is referred to herein as a "reflection-based image" or a "main image", interchangeably, which encompasses any optical or digital signal representation of a scene acquired at any spectral region, encompasses images obtained by either active illumination imaging or passive imaging, and encompasses both a single image frame and a sequence of image frames (i.e., a "video image").

Camera 104 further includes optics 114, operative to direct reflected light pulses 124 to image sensor 112. Optics 114 may include: lenses, mirrors, fiber optics, waveguides, and the like. Camera 104 includes optional filters 116, operative to filter incoming light 124 according to particular filtering criteria. Filters 116 may be integrated with image sensor 112, and/or disposed in adjacent optics 114. For example, filters 116 may include at least one bandpass filter, which passes through only wavelengths in the spectral range emitted by light source 102 (e.g., NIR light), while blocking light at other wavelengths. Such a bandpass filter may thus reduce the level of incoming light from certain high-intensity sources in the imaged scene, such as those that reflect/emit light in the visible spectrum (e.g., the headlights of oncoming vehicles). Filters 116 may also include a spectral filter, such as to direct selected wavelengths to different pixels of image sensor 112. For example, some pixels may be configured to receive light only in the NIR spectrum, while other pixels may be configured to receive light only in the SWIR spectrum. Filters 116 may further include a polarization filter, such as in conjunction with a light source 102 that emits polarized light, where the polarization filter is configured to block incoming light having a particular polarization from reaching image sensor 112. Generally, objects reflect light without preserving the polarization of the incident light, but certain highly-reflective objects, such as retroreflective traffic signs, do preserve the incident light polarization. Thus, a polarization filter may be configured to pass through received pulses 124 with a substantially perpendicular polarization to that of the emitted pulses 122, thereby reducing intense reflections from high-intensity sources and mitigating potential saturation or blooming effects in the generated active image. Imaging system 100 may adjust the degree by which the polarization is altered, such as by applying a partial rotation of the polarization (e.g., between 0-90° rotation) to reduce reflections from objects further away in the environment. Filters 116 may be implemented on the pixel array of image sensor 112 (i.e., such that different sensor array pixels are configured to only accumulate light pulses having different wavelength/spectral/polarization properties).

According to an embodiment of the present invention, image sensor 112 is a linear non-HDR sensor (i.e., having a linear/non-logarithmic pixel read-out scheme). Image sensor 112 may alternatively be embodied by a logarithmic HDR sensor, or a sensor with a combined linear/logarithmic response. The signals 124 received by image sensor 112 may be processed using an adaptive beamforming scheme to provide directional sensitivity. Imaging system 100 may optionally include multiple cameras 104 and/or image sensors 112, such that different cameras/sensors are configured to collect reflections of different transmitted laser pulses 122. For example, 3D information (i.e., a stereoscopic image) can be extracted using a triangulation and/or pulsing/gating scheme.

Controller 106 dynamically and adaptively controls the operation of light source 102 and/or camera 104. For example, controller 106 synchronizes the emission of laser pulses 122 by light source 102 with the exposure of camera 104 for implementing active-gated imaging. Controller 106 also sets the various parameters of the emitted light pulses 122, such as the pulse start time, the pulse duration (pulse width), the number of pulses per frame, and the pulse shape and pattern. Controller 106 may adjust the frame rate of camera 104, or other parameters relating to the image frames captured by cameras 104. For example, controller 106 may establish the illumination level for each acquired frame and for each portion or "slice" (i.e., DOF) of a frame, such as by controlling the number of emitted light pulses 122 and collected reflections 124 for each frame slice, by controlling the number of frame slices within each frame, and/or by controlling the exposure duration of camera 104 as well as the timing of the exposure with respect to the emitted light pulse 122. Controller 106 may also control the gain of image sensor 112, such as by using an automatic gain control (AGC) mechanism. In general, controller 106 may dynamically adjust any parameter as necessary during the course of operation of imaging system 100. Controller 106 may be integrated in a single unit together with camera 104 and/or with image processor 108.

Image processor 108 receives the main image captured by camera 104 and performs relevant image processing and analysis. Image processor 108 may merge or combine supplementary image information acquired by image sensor 112 with the main image to generate a fused image, as will be elaborated upon hereinbelow. Image processor 108 may also analyze the acquired images (and/or a fused image) to detect and/or identify at least one object of interest in the environment, as will be discussed further hereinbelow.

Display 110 displays images generated by imaging system 100. The displayed image may be combined with the ambient scenery, allowing a user to view both the display image and the ambient scene simultaneously, while maintaining external situational awareness. For example, display 110 may be a head-up display (HUD), such as a HUD integrated in a vehicle windshield of a vehicle-mounted night vision system. Display 110 may also be a wearable display, embedded within an apparatus worn by the user (e.g., a helmet, a headband, a visor, spectacles, goggles, and the like), or alternatively may be the display screen of a mobile or handheld device (e.g., a smartphone or tablet computer).

System further includes a data communication channel 120, which allows for sending images, notifications, or other data between internal system components or to an external location. Data communication channel 120 may include or be coupled with an existing system communications platform, such as in accordance with the CAN bus and/or on-board diagnostics (OBD) protocols in a vehicle. For example, imaging system 100 may receive information relating to the current vehicle status, such as: velocity; acceleration; orientation; and the like, through the vehicle communication bus. Imaging system 100 may also receive information from external sources over communication channel 120, such as location coordinates from a global positioning system (GPS), and/or traffic information or safety warnings from other vehicles or highway infrastructure, using a vehicular communication system such as vehicle-to-vehicle (V2V) or vehicle-to-infrastructure (V2I).

Imaging system 100 may optionally include and/or be associated with additional components not shown in FIG. 1, for enabling the implementation of the disclosed subject matter. For example, system 100 may include a power supply (not shown) for providing power to the various components, which may be integrated with, or receive power from, the main power source in the vehicle. System 100 may further include a memory or storage unit (not shown) for temporary storage of image frames or other types of data. System 100 may also include an operator interface (not shown) for allowing an operator of system 100 to control various parameters or settings associated with the components of system 100. System 100 may also include a vehicle interface (not shown) for allowing another system in the vehicle to control various parameters or settings associated with the components of system 100.

The components and devices of imaging system 100 may be based in hardware, software, or combinations thereof. It is appreciated that the functionality associated with each of the devices or components of system 100 may be distributed among multiple devices or components, which may reside at a single location or at multiple locations. For example, the functionality associated with controller 106 or image processor 108 may be distributed between multiple controllers or processing units.

According to an embodiment of the present invention, imaging system 100 is mounted onto a vehicle. The term "vehicle" as used herein should be broadly interpreted to refer to any type of transportation device, including but not limited to: an automobile, a motorcycle, a truck, a bus, an aircraft, a boat, a ship, and the like. It is appreciated that the imaging system of the present invention may alternatively be mounted or integrated at least partially on a non-vehicular platform, such as a stationary, portable or moveable platform (e.g., a pole, fence or wall of a secured perimeter or surveillance zone), or further alternatively embedded within a stationary or mobile device (such as a smartphone, a computer, a camera, and the like).

Figure 2:
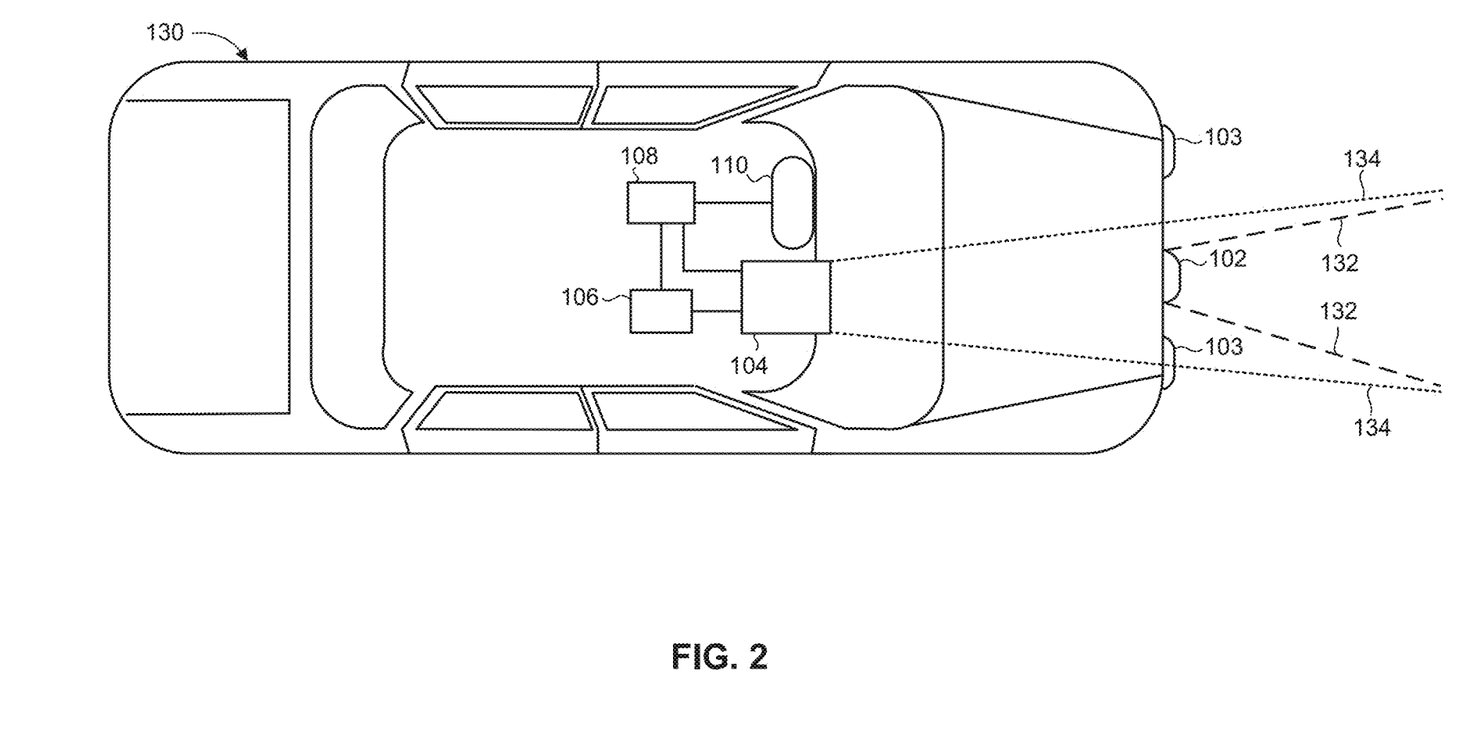
FIG. 2 is a schematic illustration of a top view of the imaging system of FIG. 1 mounted in a vehicle, constructed and operative in accordance with an embodiment of the present invention.

Reference is now made to FIG. 2, which is a schematic illustration of a top view of the imaging system (100) of FIG. 1 mounted in a vehicle, referenced 130, constructed and operative in accordance with an embodiment of the present invention. Display 110 is mounted in front of a user, such as the driver or passenger of vehicle 130. For example, display 110 may be a heads-up display (HUD) which projects images on the vehicle dashboard or windshield. Imaging system 100 may be installed in vehicle 130 in a "forward looking configuration", in which light source 102 and camera 104 face toward the front side of vehicle 130 (as depicted in FIG. 2), or alternatively may be installed in a "rear looking configuration" in vehicle 130 where the components face the rear side of vehicle 130. Imaging system 100 may also be configured to provide images of a perimeter surrounding vehicle 130, such as by scanning or intermittently repositioning the field of view (FOV) of camera 104 and/or the field of illumination (FOI) of light source 102 (e.g., to obtain approximately 360° coverage around vehicle 130). Light source 102 may be integrated in the vehicle headlights 103 (in a forward looking configuration) or taillights (in a rear looking configuration). Alternatively, light source 102 can be a standalone unit, such as a fog lamp or other illuminator mounted in the front grille (as depicted in FIG. 2), or in the bumper or a side mirror of vehicle 130. Light source 102 may be embodied as multiple elements, such as within two separate vehicle headlights 103. Camera 104 is mounted to any appropriate interior or exterior surface of vehicle 130. For example, camera 104 may be mounted on an external surface of vehicle 130, such as on the front (exterior) side of the vehicle windshield or window, in order to avoid degradation (transmission loss) of the reflected or emitted signal (pulses 122, 124) due to the windshield or window. Alternatively, camera 104 may be installed on an interior vehicle surface, such as on the inside of a vehicle windshield configured to be penetrated by the incoming reflected pulses 124 (which may require increasing the intensity of the illumination light). The FOV of camera 104 (depicted by the dotted lines 134 in FIG. 2), overlaps with and may be substantially similar to the FOI of light source 102 (depicted by the dashed lines 132 in FIG. 2). Controller 106 is disposed in or mounted on vehicle 130, and may be integrated with camera 104, with image processor 108, and/or with other vehicle control units (not shown). All the elements of system 100 are configured and mounted such that they do not interfere with the functioning of other existing vehicle components, and produce minimal interference to the driver of vehicle 130.

System 100 images the environment in the vicinity of vehicle 130. In particular, light source 102 emits a series of light pulses 122 to illuminate the scene, at a FOI 132 generally spanning at least the width of the road (including various traffic signs at the side of the road), and camera 104 collects the light pulses 124 reflected from objects in the scene and generates a reflection-based image. Image processor 108 receives the acquired reflection-based image and identifies at least one oversaturated image portion in the reflection-based image, resulting from at least one high-intensity source in the imaged environment. The term "oversaturated image portion", as used herein, refers to image content characterized by excessive brightness (i.e., appearing overexposed or "washed out") that renders the image details unclear, ambiguous and/or indecipherable, as a result of the reflection signal exceeding the dynamic range of the associated sensor pixel and leading to pixel saturation and perhaps also photon overflow into neighboring pixels.

Image processor 108 uses supplementary image information acquired by image sensor 112, in order to decipher or interpret the oversaturated image portion in the reflected image. The term "interpret" is used herein broadly as obtaining any meaningful information from the oversaturated image portion, such as for example, identifying the type and/or the content of a road sign associated with the oversaturated image portion. The supplementary information may take on multiple forms, as elaborated upon hereinbelow. Image processor 108 may detect and identify the presence of an object of interest in the oversaturated image portion using the supplementary image information, and provide an indication of the detected object to a user of system 100.

Figure 3:
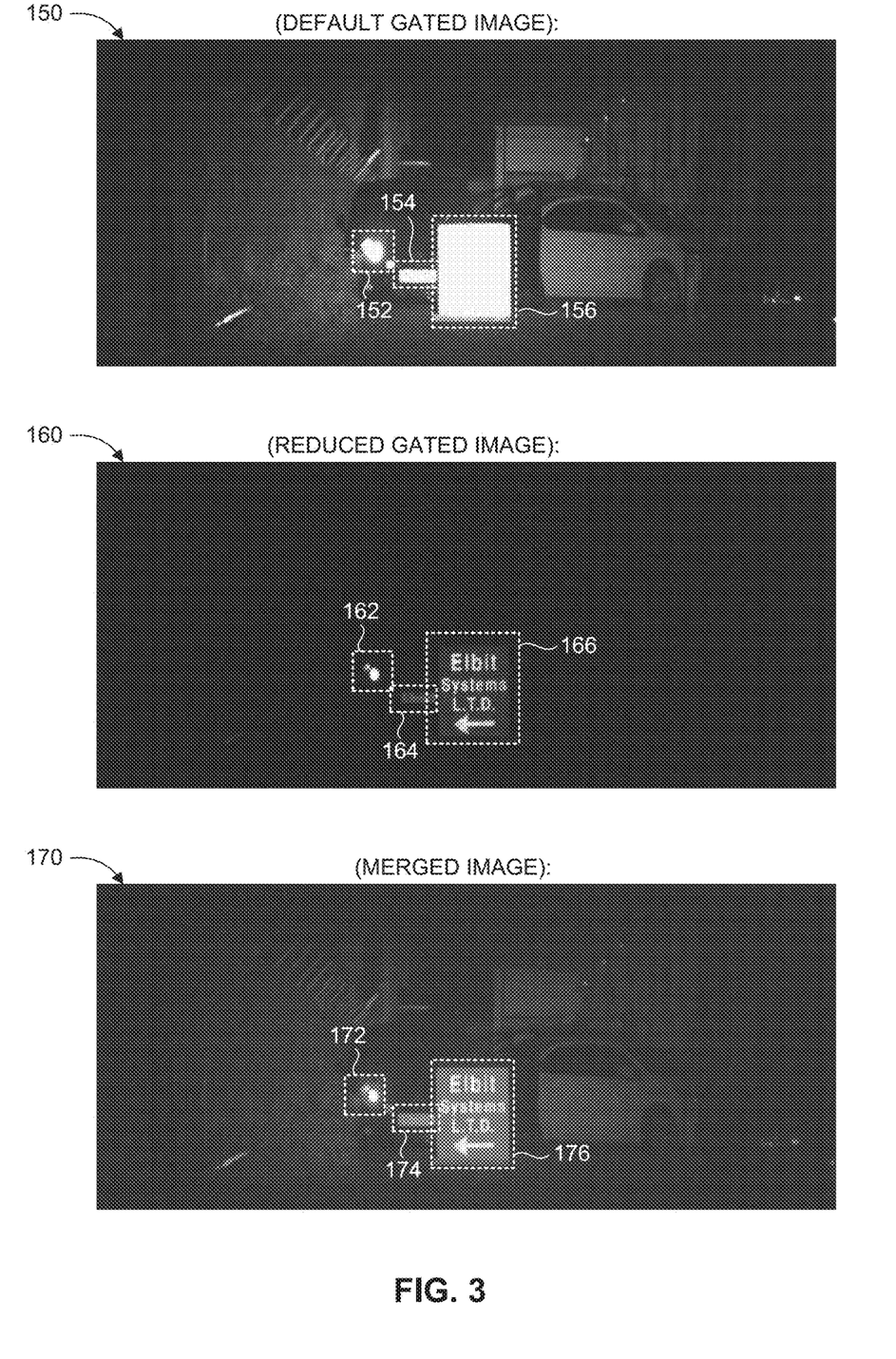
FIG. 3 is an exemplary set of image frames acquired by the imaging system of FIG. 1 when implementing a first approach of supplementary imaging of high-intensity sources, operative in accordance with one embodiment of the present invention.

According to a first embodiment of the present invention, the supplementary image information is obtained from a low-illumination secondary image frame acquired using a reduced illumination gating scheme. Reference is now made to FIG. 3, which is an exemplary set of image frames acquired by the imaging system (100) of FIG. 1 when implementing a first approach of supplementary imaging of high-intensity sources, operative in accordance with one embodiment of the present invention. Camera 104 acquires a first image frame (a "main image frame"), referenced 150, using a default gating scheme. Image processor 108 processes image frame 150, and identifies oversaturated image portions 152, 154, 156, arising from high-intensity sources in the imaged environment. Subsequently, camera 104 acquires a secondary image frame, referenced 160, of the same DOF as image frame 150, using a reduced-illumination gating scheme. In particular, the number of gating cycles (i.e., number of transmitted pulses/accumulated reflections) of secondary image frame 160 is substantially fewer than the number of gating cycles of main image frame 150. For example, the number of gating cycles of the secondary image frame 160 is approximately 1% (or less) as the number of gating cycles of the main image frame 150. For example, light source 102 emits one thousand (1000) pulses 122, and image sensor 112 accumulates one thousand (1000) reflected pulses 124 to generate main image frame 150, whereas light source 102 emits only five (5) pulses 122 and image sensor 112 accumulates five (5) reflected pulses 124 to generate secondary image frame 160 (e.g., a ratio of approximately three orders of magnitude). It is noted that controller 106 may adaptively adjust additional parameters relating to light source 102 and/or camera 104 in order to implement the differential gating schemes of images 150, 160. For example, controller 106 may adjust the pulse intensity, the pulse width, the pulse shape, and/or the number of pulses emitted by light source 102, as well as the timing and duration of camera 104 activation (exposure time), to selectively accumulate different reflections in each image frame 150, 160. Controller 106 may take into account the environmental conditions in the imaged scene when adjusting the parameters, such as the weather and climate or the road conditions. Image processor 108 processes (e.g., in real-time) secondary image frame 160, particularly analyzing the image portions 162, 164, 166 corresponding to the oversaturated image portions 152, 154, 156 previously identified in main image 150. Image processor 108 interprets and identifies the features contained within image portions 162, 164, 166, for example, as representing: a vehicle headlight (162); a retroreflective vehicle license plate (164); and a retroreflective sign (166), respectively. It is appreciated that additional details that were imperceptible or unclear in image frame 150 are made readily apparent in secondary image frame 160, such as the precise text contained within the license plate or traffic sign of image portions 164, 166. Image processor 108 may optionally generate a merged image, referenced 170, by combining the image portions 162, 164, 166 of secondary image frame 160 with the rest of main image frame 150, using suitable image fusion techniques. Display 110 may then display merged image frame 170 to the user (e.g., a driver or passenger of vehicle 130). The respective image portions 172, 174, 176 of merged image frame 170 appear clearer and more easily discernible to the user, as compared to the corresponding image portions 152, 154, 156 of the original image frame 150. Display 110 may also selectively display image frames 150, 160, such as presenting them side by side or (at least partially) overlaid over one another. Instead of (or in addition to) being displayed, merged image 170 may be used directly by an automated night vision or driving assistance application. It is noted that image processor 108 may repeat the aforementioned process over additional iterations, such as by further enhancing image frame 170 using additional supplementary image information (e.g., acquired by another image source or other means).

Figure 4:
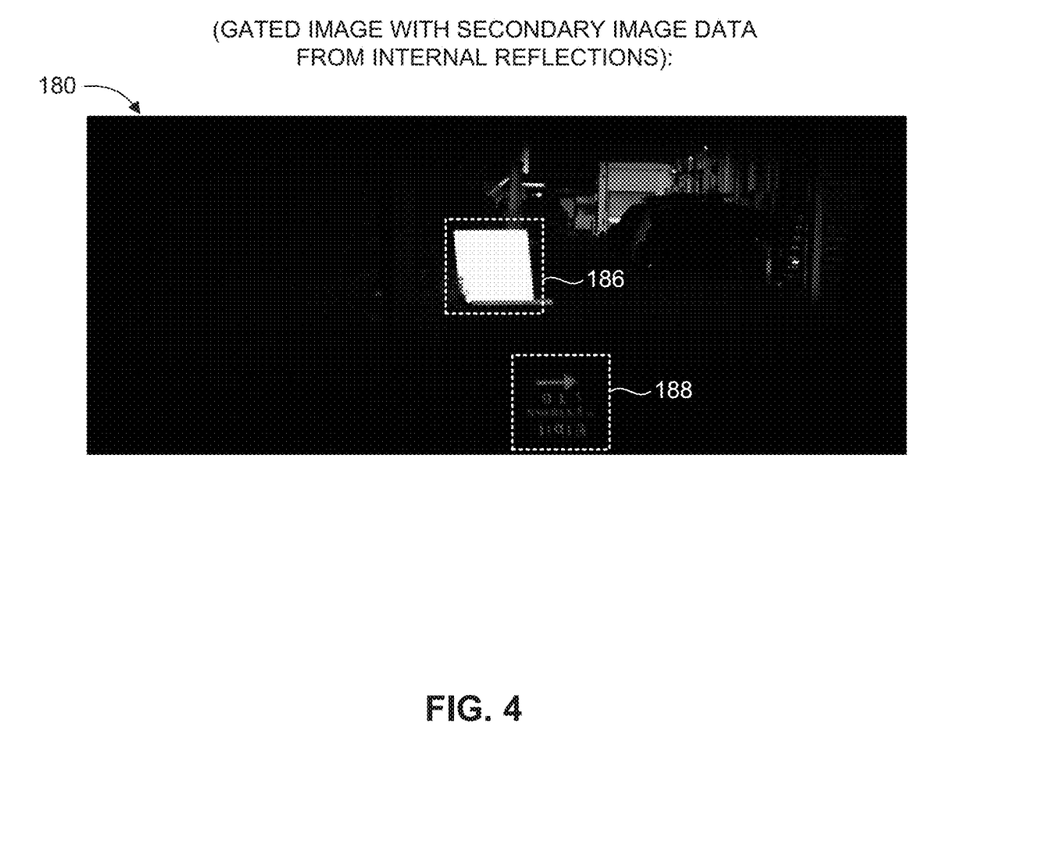
FIG. 4 is an exemplary image frame acquired by the imaging system of FIG. 1 when implementing a second approach of supplementary imaging of high-intensity sources, operative in accordance with another embodiment of the present invention.

According to a second embodiment of the present invention, the supplementary image information is obtained from low-illumination secondary image content that appears in the acquired image frame due to internal reflections of the reflected pulses between optical elements of the camera. Reference is now made to FIG. 4, which is an exemplary image frame, referenced 180, acquired by the imaging system (100) of FIG. 1 when implementing a second approach of supplementary imaging of high-intensity sources, operative in accordance with another embodiment of the present invention. Camera 104 acquires active-gated image frame 180. Image processor 108 processes image frame 180, and identifies oversaturated image portion 186 arising from a high-intensity source in the imaged environment. Image processor 108 further identifies, in the same image frame 180, a reduced-illumination secondary image portion 188, which contains image content respective of oversaturated image portion 186. In particular, secondary image portion 188 appears in image frame 180 as a result of the received reflected pulses 124 having undergone additional internal reflections between optical elements of camera 104, before being accumulated again by image sensor 112. For example, reflected pulses 124 may propagate back and be further reflected between a first optical lens (of optics 114) and an external spectral filter (of filters 116), and then re-accumulated by image sensor 112, when capturing image frame 180. The internal reflections may result from: certain properties of an anti-reflection coating, the angle of incidence of the emitted/reflected light, and/or parameters of the optical elements (e.g., their relative positions and orientations). The internal reflections may be restricted to certain pixels of image sensor 112 relative to the FOI of light source 102. In particular, it may be ensured that the internally reflected pulses 124 impinge on a "dark region" of image sensor 112 (corresponding to a scene area that is not illuminated by light source 102), rather than on an "illuminated region" of image sensor 112 (corresponding to a scene area that is illuminated by light source 102, to enable the extraction of secondary image portion 188 for image fusion. This may be achieved by maneuvering or repositioning optical elements of camera 104 (e.g., rotating filters). Accordingly, secondary image portion 188 may appear at a different location than oversaturated image portion 186 in image frame 180, such as opposite or adjacent thereto. Due to the diminished intensity of the received reflected pulses 124 after undergoing additional internal reflections in camera 104, secondary image portion 188 is characterized with a lower illumination level, allowing image processor 108 to interpret and decipher the features and details that appear imperceptible in oversaturated image portion 186. Thus, image processor 108 accurately identifies image portion 188 as representing a retroreflective sign in the imaged environment, as well as deciphering the text that appears on the sign. Image processor 108 may optionally generate a merged image (not shown) by fusing image portion 188 onto image portion 186 using suitable image fusion techniques. Display 110 may then display the merged image frame (and/or the original acquired image frame 180) to the user. The secondary image content 188 (or an image fusion version based on secondary image content 188), will thus appear clearer and more easily discernible to the user, as compared to the corresponding image portion 186. Instead of (or in addition to) being displayed, the merged image may be used directly by an automated night vision or driving assistance application.

Figure 5A:
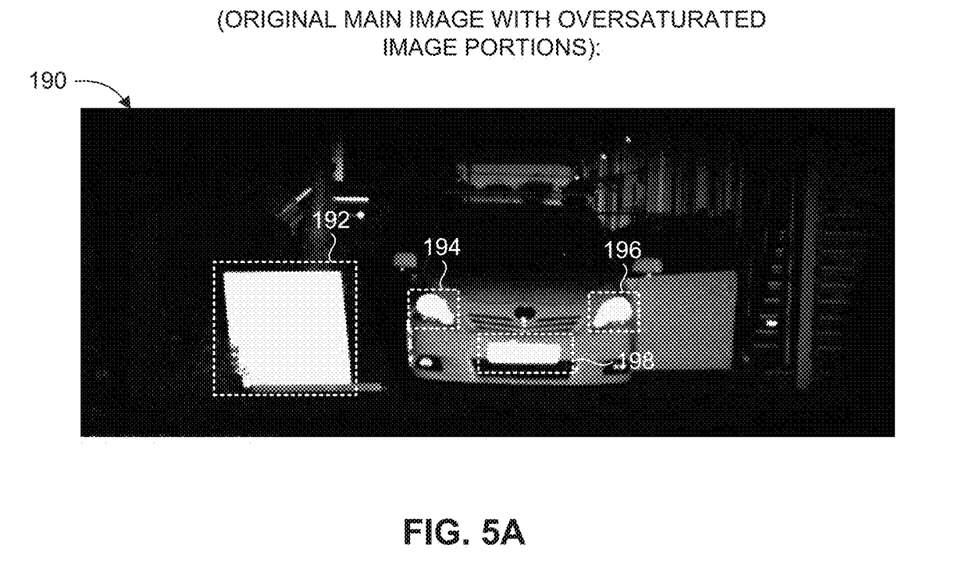
FIG. 5A is an exemplary first image frame with oversaturated image portions, acquired by the imaging system of FIG. 1, operative in accordance with a further embodiment of the present invention.
Figure 5B:
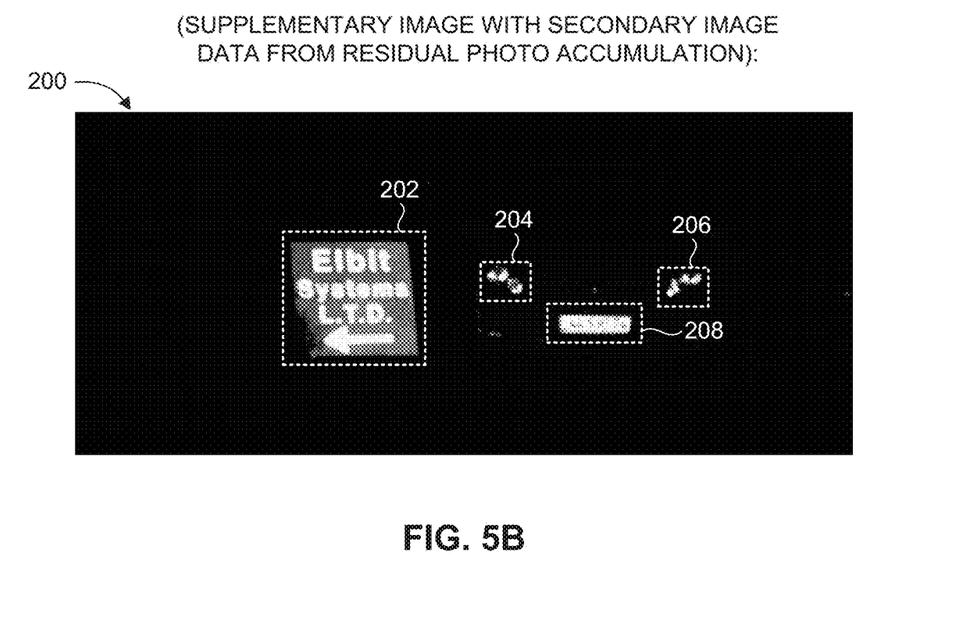
FIG. 5B is an exemplary secondary image frame acquired by the imaging system of FIG. 1, corresponding to the image frame of FIG. 5A, when implementing a third approach of supplementary imaging of high-intensity sources, operative in accordance with a further embodiment of the present invention.

According to a third embodiment of the present invention, the supplementary image information is obtained from a low-illumination secondary image frame acquired by residual photo accumulation when image sensor 112 is in a non-exposure state. Reference is now made to FIGS. 5A and 5B. FIG. 5A is an exemplary first image frame, referenced 190, with oversaturated image portions, acquired by the imaging system (100) of FIG. 1, operative in accordance with a further embodiment of the present invention. FIG. 5B is an exemplary secondary image frame, referenced 200, acquired by the imaging system (100) of FIG. 1, corresponding to the image frame of FIG. 5A, when implementing a third approach of supplementary imaging of high-intensity sources, operative in accordance with a further embodiment of the present invention. Camera 104 acquires a first ("main") image frame 190 of the environment, which may be gated or non-gated. Image processor 108 processes first image frame 190 and identifies oversaturated image portions 192, 194, 196, 198 arising from high-intensity sources in the imaged environment. Subsequently, camera 104 acquires a secondary ("supplemental") image frame 200, using residual photo accumulation when image sensor 112 is in a non-exposure state. Image sensor 112 may be brought into a non-exposure state by closing the transfer gate that transfers charge from the photodiode to the floating diffusion node of the pixel in the sensor array (while keeping the camera lens shutter open, if applicable), and maintaining illumination from light source 102 as in regular (default) imaging. In such a non-exposure state, image sensor 112 may nevertheless accumulate residual or "leakage" photons in the form of signal charge stored in the memory node (MN) or a surplus signal originating from the pinned diode accessing the MN. This phenomenon is particularly prevalent in CMOS-based sensors, where it is difficult to completely mask the MN and floating diffusion in the sensor array pixel. It is noted that secondary image frame 200 may also represent an original ("main") image acquired by image sensor 112, such as when imaging when a high-level of ambient light is present (e.g., during daytime). If operating in a non-gating mode, then the intensity or illumination level of secondary image 200 may be controlled by selectively adjusting the relative operational times of light source 102 and camera 104. For example, camera 104 may be set to initially wait for a certain number of pulses (e.g., 10 pulses) during residual photon MN accumulation, and if this number is deemed insufficient (i.e., if the intensity level of the resultant secondary image frame 200 is considered too low), then camera 104 may be subsequently set to wait for a larger number of pulses (e.g., 100 or 1000 pulses) for generating updated secondary images 200. Image processor 108 processes the reduced illumination secondary image 200 resulting from the residual photon accumulation, and identifies image portions 202, 204, 206, 208 corresponding to the respective oversaturated image portions 192, 194, 196, 198 of first image frame 190. Image processor 108 interprets and identifies the features contained within image portions 202, 204, 206, 208 (as representing: a retroreflective sign (202); vehicle headlights (204, 206); and a vehicle license plate (208), respectively), including relevant details which were imperceptible in main image 190. Image processor 108 may optionally generate a merged image (not shown), by combining image portions 202, 204, 206, 208 with main image 190, using suitable image fusion techniques. Display 110 may then display the merged image frame (and/or main image frame 190 and/or reduced illumination image frame 200) to the user. The respective image portions 202, 204, 206, 208 (or an image fusion version thereof) will thus appear clearer and more easily discernible to the viewer, as compared to the corresponding oversaturated image portions in the first image 190. Instead of (or in addition to) being displayed, the merged image may be used directly by an automated night vision or driving assistance application. It is appreciated that the third embodiment of the present invention may also be implemented using passive imaging (rather than active illumination imaging), where image frames 190, 200 are captured without the use of light source 102.

Image processor 108 may be configured to provide an indication of at least one object of interest in the environment, such as by detecting and identifying a high-intensity source associated with oversaturated image content in an acquired image. An object of interest may represent a unified physical object or entity located in the real-world environment, or may represent a general environmental feature or collection of features (and not necessarily a unified physical object). For example, processor 108 may detect obstacles or relevant objects located along the current path or route of vehicle 130, such as the presence of: a pedestrian, another vehicle, an animal, a traffic sign, and the like. Processor 108 may designate a detected object of interest in the environment for further investigation and/or to be or brought to the attention of a user (e.g., a driver or passenger of vehicle 130). System 100 may generate an alert or notification relating to an object of interest, such as by providing a visual or audio indication thereof. For example, system 100 may present supplementary content (e.g., augmented reality) overlaid onto displayed images (e.g., fused image 170), such as text/graphics/symbols indicating information or characteristics associated with objects of interest in the imaged environment (e.g., type of object; distance from vehicle 130; level of potential danger; and the like). The alert or notification may be integrated with a driving assistance module in vehicle 130 configured to provide a driving assistance feature, such as: forward collision warning (FCW), lane departure warning (LDW), traffic sign recognition (TSR), high beam control, vehicle/pedestrian/animal detection, and any combination thereof.

Filters 116 may also be used to provide supplementary image information and to assist in identifying a high-intensity source associated with oversaturated image content. For example, camera 104 may include a spectral filter 116, configured to direct selected wavelengths to different pixels of image sensor 112. A spectral filter 116 may be embodied by a repeating cluster of a 2 by 2 pixel array, with the cluster repeating itself upon a portion (or the entirety) of the image sensor array, where for example, the first pixel is configured to receive light in the Blue spectrum, the second pixel is configured to receive light in the Green spectrum, the third pixel is configured to receive light in the Red spectrum, and the fourth pixel is configured to receive light in the NIR spectrum.

Image sensor 112 may include an anti-blooming mechanism, configured to direct excess saturation from a respective sensor array pixel to the neighboring pixels, in order to avoid or minimize a blooming ("halo") effect in the sensor image. The anti-blooming mechanism may be embodied by an anti-blooming (AB) gate configured to reset the photodiode and direct excess saturation to neighboring pixels. Alternatively, blooming can be controlled by setting the voltage on the reset gate (instead of ground) during integration. Further alternatively, anti-blooming may be achieved by implanting a drain to the sensor pixel for drawing off excess photons from the reflection signal. The anti-blooming mechanism may be adaptively controlled, such as by using feedback from previous image frames to determine which sensor pixels to drain and by how much. An anti-blooming mechanism is particularly applicable for the third embodiment of the present invention (acquiring secondary image frame by residual photo accumulation), but is generally applicable for the first and second embodiments as well.

In addition to supplementary imaging of high-intensity sources in accordance with at least one of the three aforementioned approaches, imaging system 100 may also adaptively control gating parameters in order to minimize excessively intense reflections from the high-intensity sources. For example, controller 106 may modify at least one parameter of light source 102 or camera 104, such as in real-time. Examples of such parameters include: the pulse width; the pulse intensity (peak power); the pulse shape; number of emitted pulses; a gating cycle duration; a delay time of at least one gating cycle; frame rate; at least one DOF; a maximum range to be imaged; the timing and duration of camera 104 activation (e.g., exposure rise and fall times); the voltage supply of gating control transfer of a sensor pixel; the gain of image sensor 112; intrinsic parameters of light source 102; intrinsic parameters of image sensor 112 or camera 104; sensitivity of image sensor 112 (e.g., sensor control and/or gain voltages); and the like. For example, if a high-intensity source is known to be present at a particular distance from vehicle 130 (e.g., at approximately 50 meters), then the illumination pulses 122 and reflected pulses 124 may be established so as to image distance slices (DOFs) located before and after the high-intensity source, while "skipping over" the distance slice in the immediate vicinity of the high-intensity source (e.g., by imaging a first DOF of up to 45 meters, and a second DOF from 55 meters and beyond). This gating scheme can be updated (e.g., in real-time) to take into account the movements of vehicle 130 and/or the movements of the high-intensity source (i.e. by updating the DOFs accordingly). Controller 106 may take into account the environmental conditions in the imaged scene when adjusting the parameters, such as, for example, the weather and climate or the road conditions. Imaging system 100 may implement a selected gating scheme so as to generate successive image frames at varying illumination levels, allowing for image fusion between low and high illumination frames, and the subsequent interpretation of image details associated with high-intensity sources that are indecipherable in the high illumination image frames.

A further approach to minimize excessively intense reflections from high-intensity sources located at known distances is the use of light polarization, by means of a polarization filter (as discussed hereinabove). For another example, the phenomenon of residual "ghost" images, which refers to the appearance of phantom copies of the high-intensity sources in the acquired image (generally caused by internal lens reflections), may be mitigated by tilting (adjusting the inclination) of a spectral filter 116 and/or optics 114 of camera 104.

Yet another approach for minimizing excessively intense reflections from high-intensity sources involves using the addressable switching mechanisms of image sensor 112. In particular, if image sensor 112 is configured such that individual pixels, or groups of pixel clusters, may be switched (gateable) independently, then after identifying oversaturated image portions in an acquired image frame, the internal switch circuitry of image sensor 112 may be configured so that the relevant sensor pixels (associated with the oversaturated image portions) will have fewer pulses/exposures (gates), thus accumulating a lower intensity level of the incident photons, relative to the other sensor pixels, which will remain at the default switching setting.

It is noted that the main image (e.g., image frames 150, 190) and/or the supplementary image information (e.g., image frames 160, 180, 200) may be pre-processed prior to fusion, such as by undergoing fixed-pattern noise (FPN) suppression, contrast enhancement, gamma correction, and the like. Image processor 108 may also implement image registration of the image frames if necessary, such as when vehicle 130 is in motion during the operation of imaging system 100, or if elements in the imaged environment are moving with respect to imaging system 100.

According to an embodiment of the present invention, image processor 108 may further perform character recognition of objects in the scene with text or numerical data, such as traffic signs, for example by using optical character recognition (OCR) techniques known in the art. Image processor 108 may also analyze textual or numerical content to provide supplemental driving assistance features, such as to identify potential driving hazards or for navigation purposes. For example, system 100 may notify the driver of vehicle 130 if he/she is turning onto the correct road by analyzing the content of traffic or street signs (representing a high-intensity source) in the vicinity of the vehicle 130, optionally in conjunction with available maps and real-time location information of vehicle 130. System 100 may determine the optimal illumination level for imaging, in order for the visibility of characters on the sign to be as high as possible, and control light source 102 accordingly. For example, controller 106 may adjust the operation parameters of light source 102 and/or camera 104 such as to acquire the lowest illumination image that will enable accurate pattern and text recognition (e.g., in order to conserve power and to minimize saturation effects). Following a general determination of the type of traffic or street sign (or other high-intensity source), such as based on the shape and/or image information associated with the sign (e.g., text/numerical data), image processor 108 may also add color information to the traffic signs on an acquired or fused image. Such color information may also be obtained from spectral filters 116 of camera 104. Active-gated imaging may also be applied for removing unwanted markings in the image frames, such as road tar marks or concrete grooves.

Imaging system 100 may optionally include additional detection/measurement units or imaging sources (not shown), such as: a radar detector; a lidar detector; stereoscopic cameras; and the like. The additional detection sources may be remotely located from at least some components of system 100, and may forward measurement data to system 100 via an external (e.g., wireless) communication link. The information obtained from the additional sources may be used to enhance an acquired or generated (fused) image, and/or to control the operation of light source 102 or camera 104. For example, system 100 may obtain distance information relative to potential high-intensity sources in the environment (e.g., from a laser rangefinder), and controller 106 may then adjust at least one gating parameter accordingly, such as to minimize or avoid excessive reflections from the DOF where the high-intensity source is located. System 100 may also utilize distance information for object detection and identification purposes. For another example, system 100 may obtain information relating to the environmental conditions in the imaged environment, such as for example: lighting conditions (e.g., sunny or overcast); weather or climate conditions (e.g., rain, fog, or snow); time of day (e.g., day or night); month of year or season; and the like. The obtained environmental conditions may be utilized for enhancing an acquired or generated (fused) image (e.g., adjusting the brightness level in the image); for controlling the operation of light source 102 and/or camera 104 (e.g., adjusting at least one gating parameter); and/or for enhancing object detection and identification. For yet another example, image processor 108 may use a digital map or other location data source to assist and enhance the interpretation of high-intensity sources (e.g., to navigate a driver of vehicle 130 based on character recognition of street signs in the image in conjunction with map analysis).

According to another embodiment of the present invention, the frame duration ($T_{FRAME}$) of either the main image and/or the (low-illumination) secondary image may be selectively controlled. For example, the frame readout (i.e., reading the accumulated signal data for each pixel) may be performed immediately following the final gating cycle of that frame, or during the gating cycles of the subsequent image frame, so as to minimize the total frame duration, thus reducing the collected ambient light in that image frame (which may degrade image quality). For example, if the cycle duration ($T_{CYCLE}$) for each gating cycle is 5 μs, then a main image frame characterized by 1000 pulses/exposures would have a total frame duration of: $T_{FRAME\text{-}main}$=5 μs×1000 pulses/exposures=5 ms, while a secondary image frame characterized by 5 pulses/exposures would have a total frame duration of: $T_{FRAME\text{-}secondary}$=5 μs×5 pulses/exposures=0.025 ms (not including the frame readout time).

It will be appreciated that the three disclosed approaches of supplementary imaging of high-intensity sources may substantially enhance the dynamic range of an acquired active-gated image. For example, the linear gain of a merged image (generated by fusing an acquired image with supplementary image information in accordance with an embodiment of the present invention), may be characterized by a high dynamic range of approximately 80-85 dB (or greater), as compared to a standard range of approximately 60 dB, for a linear response sensor.

It is further appreciated that imaging system may be configured to operate during both day and night, and in variable weather and climate conditions (e.g., clear and sunny, overcast, rain, fog, snow, hail, etc), allowing for effective imaging and object identification by system 100 in varying environmental conditions (e.g., whether driving through dark tunnels or brightly lit outdoors).

According to another embodiment of the present invention, a plurality of imaging systems, similar to system 100 of FIG. 1, can operate together in a common environment. For example, two imaging systems 100 may be mounted onto oncoming vehicles 130 on a road, where the light emission/reception scheme of both systems 100 are synchronized so as to reduce the likelihood that the light emission of one light source 102 would result in a high-intensity source causing saturation or blooming effects in the other imaging system 100. For example, the timing of parameters relating to an image frame of at least one of the imaging systems 100 can be determined in accordance with a random hopping scheme.

Figure 6:
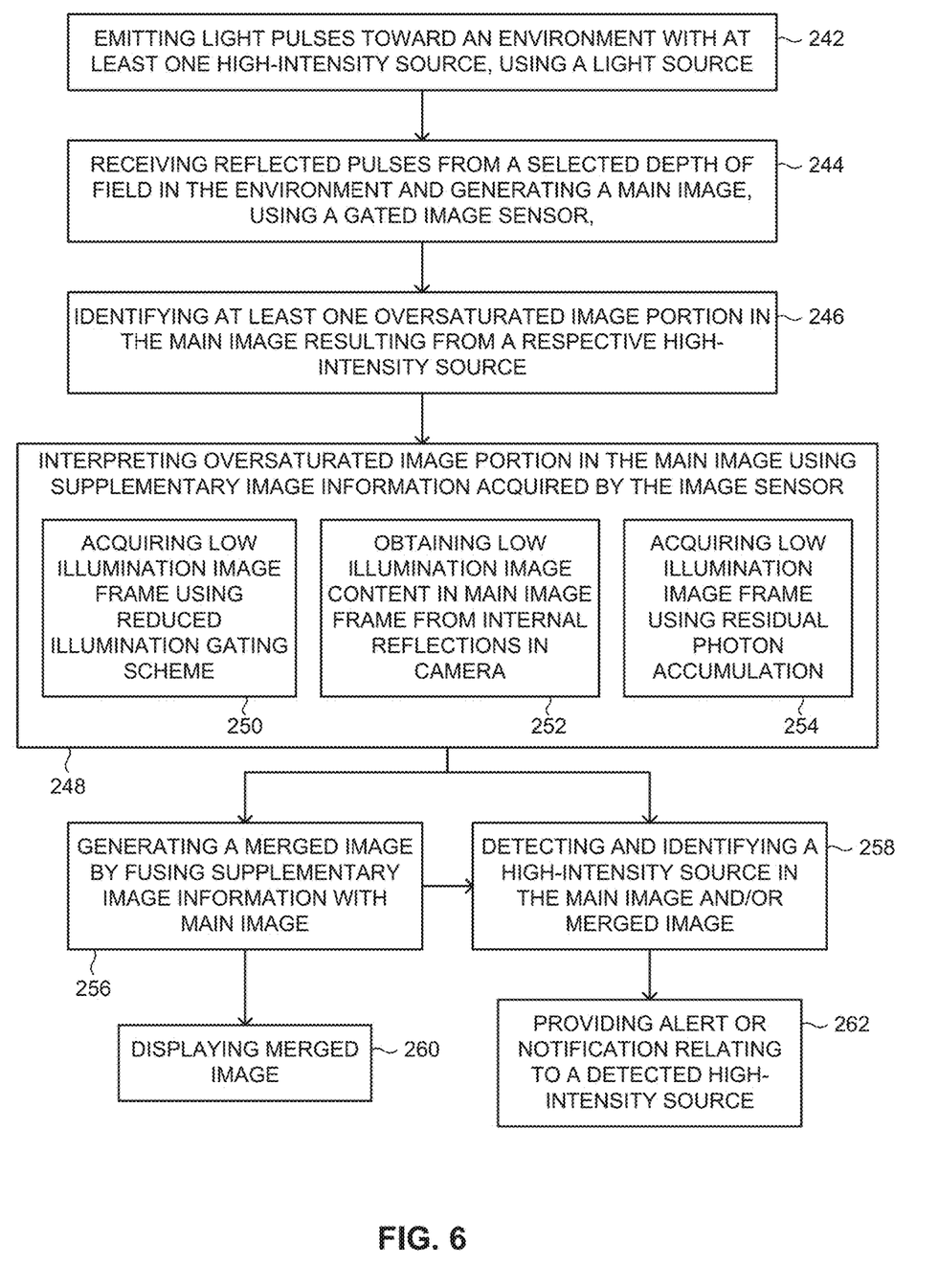
FIG. 6 is a block diagram of a method for imaging an environment with the presence of at least one high-intensity source, operative in accordance with an embodiment of the present invention.

Reference is now made to FIG. 6, which is a block diagram of a method for imaging an environment with the presence of at least one high-intensity source, operative in accordance with an embodiment of the present invention. In procedure 242, light pulses are emitted toward an environment with at least one high-intensity source, using a light source. In procedure 244, reflected pulses are received from a selected depth of field in the environment and a main image is generated, using a gated image sensor. With reference to FIGS. 1, 2 and 3, light source 102 emits at least one light pulse 122 to illuminate the environment in the vicinity of vehicle 130 (on which system 100 is mounted), and camera 104 is sequentially exposed such that image sensor 112 accumulates reflections 124 reflected from objects illuminated in the environment and generates a main image, such as image 150. Controller 106 may control the activation of light source 102 and of camera 104 and image sensor 112 to implement gated imaging, thus imaging a particular DOF. System 100 may alternatively operate using passive imaging, by collecting radiation and generating an image frame without actively illuminating the environment by light source.

In procedure 246, at least one oversaturated image portion resulting from a respective high-intensity source is identified in the main image. With reference to FIGS. 1 and 3, image processor 108 processes main image frame 150 and identifies oversaturated image portions 152, 154, 156 arising from high-intensity sources in the imaged environment (when implementing a first approach of supplementary imaging according to an embodiment of the present invention). Similarly, referring to FIGS. 4 and 5, image processor 108 identifies oversaturated image portion 186 in main image 180 (acquired when implementing a second approach of supplementary imaging according to another embodiment of the present invention), and oversaturated image portions 192, 194, 196, 198 in main image 190 (acquired when implementing a third approach of supplementary imaging according to a further embodiment of the present invention). In general, imaging system 100 may operate in a default mode of continuously acquiring main images and secondary images, and then performing image fusion and/or extraction of supplementary content associated with a high intensity source when applicable.

In procedure 248, the oversaturated image portion in the main image is interpreted using supplementary image information acquired by the image sensor. Procedure 248 may be implemented via any one of sub-procedures 250, 252, 254. In sub-procedure 250, a low illumination image frame is acquired using a reduced illumination gating scheme.

Referring to FIGS. 1 and 3, camera 104 acquires secondary image frame 160, using a reduced-illumination gating scheme relative to main image frame 150, such that the number of gating cycles (transmitted pulses/accumulated reflections) of secondary image frame 160 is substantially fewer than the number of gating cycles of main image frame 150. In sub-procedure 252, low illumination image content is obtained in the main image frame from internal reflections in the optical components of camera. Referring to FIGS. 1 and 4, camera 104 acquires reflected image 180, which includes reduced-illumination secondary image portion 188 that appears as a result of reflected pulses 124 having undergone internal reflecting between optical elements of camera 104 before being re-accumulated by image sensor 112. In sub-procedure 254, a low illumination image frame is acquired using residual photon accumulation. Referring to FIGS. 1, 5A and 5B, camera 104 acquires secondary image frame 200 by means of residual photon accumulation when image sensor 112 is in a non-exposure state, such as by closing the transfer gate from the photodiode to the floating diffusion node of the sensor array pixels.

In optional procedure 256, a merged image is generated by fusing the supplementary image information with the main image. With reference to FIGS. 1 and 3, image processor 108 generates merged image 170 by combining image portions 162, 164, 166 of supplemental image frame 160 with the rest of main image frame 150, using suitable image fusion techniques. Merged image 170 is characterized with a higher dynamic range as compared to original image 150, where image portions 172, 174, 176 of merged image 170 appear clearer and more easily discernible as compared to the corresponding image portions 152, 154, 156 of original image 150. Similarly, image processor 108 may generate a merged image by fusing image portion 188 onto image portion 186 of image 180 (FIG. 4), or by combining image portions 202, 204, 206, 208 of secondary image 200 (FIG. 5B) with main image 190 (FIG. 5A), in accordance with alternative embodiments of the present invention.

In optional procedure 260, the merged image is displayed. With reference to FIGS. 1 and 3, display 110 displays merged image 170 to a user of system 100, such as a driver or passenger of vehicle 130.

In optional procedure 258, at least one high-intensity source is detected and identified in the main image and/or merged image using the supplemental image information. Referring to FIGS. 1 and 3, image processor 108 interprets the features contained within image portions 162, 164, 166 of supplemental image frame 160, as representing: a vehicle headlight (162); a retroreflective vehicle license plate (164); and a retroreflective sign (166), respectively. Further referring to FIG. 4, image processor 108 identifies image portion 188 of image 180 (corresponding to oversaturated image portion 186) as representing a retroreflective sign. Further referring to FIG. 5, image processor 108 interprets the features contained within image portions 202, 204, 206, 208 of supplemental image frame 190, as representing: a retroreflective sign (202); vehicle headlights (204, 206); and a vehicle license plate (208), respectively.

In optional procedure 262, an alert or notification relating to a detected high-intensity source is provided. With reference to FIGS. 1, 3, system 100 generates an alert or notification relating to a detected object of interest in the environment, such as a high-intensity source associated with an oversaturated image portion interpreted using supplementary image information. For example, processor 108 detects a relevant object located in the vicinity of vehicle 130, such as the traffic sign of image portion 176, and provides a visual or audio indication thereof to an operator of vehicle 130. The alert or notification may be integrated with a driving assistance module of vehicle 130. The alert may be based on processing of the main image (e.g., image frames 150, 190), the supplementary image (e.g., image frames 160, 180, 200), or a fused image frame that combines a main image with a secondary image (e.g., image frame 170).

The method of FIG. 6 is generally implemented in an iterative manner, such that at least some of the procedures are performed repeatedly or continuously, in order to keep imaging the surrounding environment for at least a selected duration. Accordingly, imaging system 100 may use information learned from previous images in order to enhance future performance, for example, by selecting an optimal supplementary imaging technique for different scenarios and/or by adjusting imaging parameters in an optimal manner, based on previous results.

While certain embodiments of the disclosed subject matter have been described, so as to enable one of skill in the art to practice the present invention, the preceding description is intended to be exemplary only. It should not be used to limit the scope of the disclosed subject matter, which should be determined by reference to the following claims.

The invention claimed is:

1. An active-gated imaging system, for imaging an environment with the presence of at least one high-intensity source, the imaging system comprising:
    a light source, configured to emit light pulses toward said environment;
    a gated camera comprising an image sensor with a pixelated sensor array configured for digital image acquisition, said image sensor configured to receive reflected pulses from a selected depth of field (DOF) in said environment and to generate a main image, wherein the exposure mechanism of said image sensor comprises a pixelated transfer gate synchronized with the emitted pulses;
    a controller, configured to control the operation of said light source and said image sensor;
    an image processor, configured to identify at least one oversaturated image portion of said main image resulting from a respective said high-intensity source, and to interpret said oversaturated image portion using supplementary image information acquired by said image sensor, wherein said image processor is further configured to generate a merged image by combining said main image with said supplementary image information; and
    a display, configured to display at least one of:
        said main image;
        said supplementary image information; and
        said merged image.

2. The imaging system of claim 1, wherein said image sensor is configured to acquire at least one low-illumination secondary image of said DOF, wherein the number of gating cycles of said secondary image is substantially less than the number of gating cycles of said main image, said supplementary image information being obtained from said secondary image.

3. An active-gated imaging system, for imaging an environment with the presence of at least one high-intensity source, the imaging system comprising:
  a light source, configured to emit light pulses toward said environment;
  a gated camera comprising an image sensor with a pixelated sensor array configured for digital image acquisition, said image sensor configured to receive reflected pulses from a selected depth of field (DOF) in said environment and to generate a main image, wherein the exposure mechanism of said image sensor comprises a pixelated transfer gate synchronized with the emitted pulses;
  a controller, configured to control the operation of said light source and said image sensor; and
  an image processor, configured to identify at least one oversaturated image portion of said main image resulting from a respective said high-intensity source, and to interpret said oversaturated image portion using supplementary image information acquired by said image sensor,
  wherein said image sensor is configured to generate said supplementary image information in said main image, by accumulating reflected pulses from said high-intensity source after said reflected pulses undergo internal reflections between optical elements of said camera.

4. An active-gated imaging system, for imaging an environment with the presence of at least one high-intensity source, the imaging system comprising:
  a light source, configured to emit light pulses toward said environment;
  a gated camera comprising an image sensor with a pixelated sensor array configured for digital image acquisition, said image sensor configured to receive reflected pulses from a selected depth of field (DOF) in said environment and to generate a main image, wherein the exposure mechanism of said image sensor comprises a pixelated transfer gate synchronized with the emitted pulses;
  a controller, configured to control the operation of said light source and said image sensor; and
  an image processor, configured to identify at least one oversaturated image portion of said main image resulting from a respective said high-intensity source, and to interpret said oversaturated image portion using supplementary image information acquired by said image sensor,
  wherein said image sensor is configured to acquire at least one low-illumination secondary image frame of said DOF, by residual photon accumulation when said image sensor is in a non-exposure state, said supplementary image information being obtained from said secondary image frame.

5. The imaging system of claim 1, wherein said controller is further configured to adaptively control at least one gating parameter of said light source or said camera, in accordance with said supplementary image information.

6. The imaging system of claim 5, wherein said controller is configured to minimize the frame duration ($T_{FRAME}$) of at least one image frame, to reduce ambient light accumulation in said image frame.

7. A vehicle, comprising an active-gated imaging system according to claim 1.

8. A method for active-gated imaging of an environment with the presence of at least one high-intensity source, the method comprising the procedures of:
  emitting light pulses toward said environment, using a light source;
  receiving reflected pulses from a selected DOF in said environment to generate a main image, using a gated camera comprising an image sensor with a pixelated sensor array configured for digital image acquisition, wherein the exposure mechanism of said image sensor comprises a pixelated transfer gate synchronized with the emitted pulses;
  identifying at least one oversaturated image portion of said main image resulting from a respective said high-intensity source;
  interpreting said oversaturated image portion using supplementary image information acquired using said image sensor;
  generating a merged image by combining said main image with said supplementary image information; and
  displaying at least one of:
    said main image;
    said supplemental image information; and
    said merged image.

9. The method of claim 8, wherein said procedure of acquiring supplementary image information comprises acquiring at least one low-illumination secondary image frame of said DOF, wherein the number of gating cycles of said secondary image is substantially less than the number of gating cycles of said main image.

10. A method for active-gated imaging of an environment with the presence of at least one high-intensity source, the method comprising the procedures of:
  emitting light pulses toward said environment, using a light source;
  receiving reflected pulses from a selected DOF in said environment to generate a main image, using a gated camera comprising an image sensor with a pixelated sensor array configured for digital image acquisition, wherein the exposure mechanism of said image sensor comprises a pixelated transfer gate synchronized with the emitted pulses;
  identifying at least one oversaturated image portion of said main image resulting from a respective said high-intensity source; and
  interpreting said oversaturated image portion using supplementary image information acquired using said image sensor by obtaining low-illumination image content in said main image, by accumulating reflected pulses from said high-intensity source after said reflected pulses undergo internal reflections between optical elements of said camera.

11. A method for active-gated imaging of an environment with the presence of at least one high-intensity source, the method comprising the procedures of:
  emitting light pulses toward said environment, using a light source;
  receiving reflected pulses from a selected DOF in said environment to generate a main image, using a gated camera comprising an image sensor with a pixelated sensor array configured for digital image acquisition, wherein the exposure mechanism of said image sensor comprises a pixelated transfer gate synchronized with the emitted pulses;

identifying at least one oversaturated image portion of said main image resulting from a respective said high-intensity source; and interpreting said oversaturated image portion using supplementary image information acquired using said image sensor, by acquiring at least one low-illumination secondary image frame of said DOF by residual photon accumulation when said image sensor is in a non-exposure state.

12. The method of claim 8, further comprising the procedure of adaptively controlling at least one gating parameter of said light source or said camera, in accordance with said supplementary image information.

13. The method of claim 12, wherein said procedure of adaptively controlling at least one gating parameter comprises minimizing the frame duration ($T_{FRAME}$) of at least one image frame, to reduce ambient light accumulation in said image frame.

14. A vehicle, comprising an active-gated imaging system according to claim 3.

15. A vehicle, comprising an active-gated imaging system according to claim 4.

* * * * *